(«12») United States Patent
Asakura et al.

(10) Patent No.: US 7,624,407 B2
(45) Date of Patent: Nov. 24, 2009

(54) PHOTOSENSITIVE RECORDING MEDIUM CARTRIDGE WITH MOVEMENT OF SHUTTER LIMITED BY LID AND STEP PORTION AND METHOD FOR PRODUCING THE SAME

(75) Inventors: Katsuyoshi Asakura, Kanagawa (JP);
Osamu Matsuura, Kanagawa (JP);
Tomoyuki Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 299 days.

(21) Appl. No.: 11/508,208

(22) Filed: Aug. 23, 2006

(65) Prior Publication Data
US 2007/0050804 A1    Mar. 1, 2007

(30) Foreign Application Priority Data
Aug. 23, 2005    (JP)    ............. P.2005-241487

(51) Int. Cl.
*G11B 7/0037*    (2006.01)
(52) U.S. Cl. ................................................ 720/738
(58) Field of Classification Search ................ 720/738, 720/739, 736, 725, 718
See application file for complete search history.

(56) References Cited

U.S. PATENT DOCUMENTS

| 4,138,703 | A | * | 2/1979 | Stave et al. | ............... 360/133 |
| 5,408,458 | A | * | 4/1995 | Akiyama | ............... 720/739 |
| 5,537,389 | A | * | 7/1996 | Kuwa et al. | ............... 720/743 |
| 5,646,807 | A | * | 7/1997 | Ohnuki et al. | ............... 360/133 |
| 2001/0010680 | A1 | | 8/2001 | Kikuchi et al. | |
| 2002/0027874 | A1 | * | 3/2002 | Okamoto et al. | ............ 369/291 |
| 2002/0172128 | A1 | * | 11/2002 | Kim et al. | ............ 369/77.2 |
| 2003/0198177 | A1 | | 10/2003 | Horimai et al. | |
| 2006/0277563 | A1 | * | 12/2006 | Sato et al. | ............ 720/725 |
| 2007/0044118 | A1 | * | 2/2007 | Asakura et al. | ............ 720/728 |

FOREIGN PATENT DOCUMENTS

| JP | 7-210912 A | 8/1995 |
| JP | 2001-216754 A | 8/2001 |
| JP | 2003-317422 A | 11/2003 |
| JP | 2004-29476 A | 1/2004 |

* cited by examiner

*Primary Examiner*—Julie Anne Watko
(74) *Attorney, Agent, or Firm*—Sughrue Mion, PLLC (57) ABSTRACT

A photosensitive recording medium cartridge comprising: a photosensitive recording medium; a cartridge body including a disc storage portion where the photosensitive recording medium is received rotatably, an opening portion formed in a side surface of the cartridge body in an insertion direction, shutter slide surfaces offset inward and formed in an outer surface of the cartridge body so as to be connected to the opening portion-side side surface, and an inner opening for exposing a center and a recording surface of the photosensitive recording medium to the outside; a shutter as defined herein; and a lid fixed to the side surface of the cartridge body so as to close the opening portion, wherein the shutter is attached to the shutter slide surfaces while the movement of the shutter is limited by the lid and first step portions formed in boundaries between the shutter slide surfaces and the outer surface.

18 Claims, 6 Drawing Sheets

PHOTOSENSITIVE RECORDING MEDIUM CARTRIDGE WITH MOVEMENT OF SHUTTER LIMITED BY LID AND STEP PORTION AND METHOD FOR PRODUCING THE SAME

FIELD OF THE INVENTION

The present invention relates to a photosensitive recording medium cartridge and a method for producing the same. Particularly, it relates to a photosensitive recording medium cartridge reduced in the number of components to be thereby improved in assembling efficiency, and a method for producing the photosensitive recording medium cartridge.

BACKGROUND OF THE INVENTION

A holographic recording medium for recording data holographically has been already invented (e.g. see JP-A-2004-029476). This holographic recording medium is a photosensitive recording medium which is formed in such a manner that a holographic recording layer made of a photosensitive material is provided on a disc-shaped support. Since data are multiplexedly recorded as interference fringes of laser light on the holographic recording medium, the holographic recording medium can have a larger data recording volume than that of a DVD which was heretofore a popular recording medium. Exposure of the holographic recording layers to light or deposition of dust on the holographic recording layers exerts a bad influence on the performance of the holographic recording medium. For this reason, the holographic recording medium is dealt with in the condition that the holographic recording medium is received in a cartridge having a light-shielding function and a dust-proof function (e.g. see JP-A-2003-317422 (corresponding to US 2003/0198177 A1)).

In addition, as a cartridge for receiving a disc-shaped recording medium, there have been known a cartridge having a cartridge body with an opening exposing a disc-shaped recording medium to the outside, and a shutter for opening/closing the opening (e.g. see JP-A-7-210912), and a cartridge having a light-shield plate (shutter cover) further provided in the outside of a shutter (e.g. see JP-A-2001-216754 (corresponding to US 2001/0010680 A1)).

In the invention described in JP-A-2004-029476, the holographic recording medium is received in a cartridge similar to a cartridge of a DVD-RAM. This cartridge is formed out of a material small in transmittance of light rays in a wavelength range exerting influence on the holographic recording layers. Although JP-A-2004-029476 did not give any description on the detailed configuration of the cartridge, it may be conceived that the cartridge has the same configuration as that of the cartridge described in JP-A-2003-317422 (corresponding to US 2003/0198177 A1).

In the invention described in JP-A-2003-317422 (corresponding to US 2003/0198177 A1), the cartridge is made of a material capable of blocking a color sensitive to the holographic recording layer. Moreover, a sponge-like light-shield material is attached to a mating portion of a movable portion for exposing the holographic recording medium to the outside. In addition, in the description, the cartridge is provided with a cartridge body for receiving a recording medium therein rotatably, an opening provided in the cartridge body and for exposing part of the recording medium to the outside, and a shutter for opening/closing the opening.

The invention described in JP-A-7-210912 has been described on the cartridge chiefly aiming at storage of a photomagnetic disc. In the cartridge, an opening drive recess is provided in an extension portion extended from the shutter in a closing direction of the shutter, and a shutter opening member disposed in a recording/reproducing apparatus for inserting the cartridge therein engages with the opening drive recess so as to open/close the shutter.

The invention described in JP-A-2001-216754 (corresponding to US 2001/0010680 A1) has been described on the cartridge having the shutter, a slide member fixed to the shutter and the light-shield plate provided in the outside of the shutter so that the shutter is opened/closed through the slide member.

SUMMARY OF THE INVENTION

In the cartridge for receiving the holographic recording medium, when light-shielding and dust-proof treatment between the cartridge body and the shutter is not performed appropriately, light or dust goes into the cartridge to thereby exert a bad influence on the holographic recording medium. In JP-A-2004-029476, however, there is no description about a light-shielding and dust-proof structure between the cartridge body and the shutter.

In the cartridge described in any one of JP-A-2003-317422 (corresponding to US 2003/0198177 A1), JP-A-7-210912 and JP-A-2001-216754 (corresponding to US 2001/0010680 A1), the shutter is attached to shutter slide surfaces which are offset inward and provided in the outer surface of the cartridge. Since steps are formed between opposite sides of each shutter slide surface and the outer surface, attachment of the shutter is generally performed in such a manner that the shutter is pressed from the front toward the rear in the insertion direction so that the opposite surfaces of the cartridge are held by the shutter. On this occasion, since the shutter substantially shaped like a U figure in section has to be externally fitted while widened and pressed, the shutter may be deformed. When the recording medium is a photosensitive recording medium such as a holographic recording medium, even slight deformation of the shutter may cause deterioration of light-shielding performance to thereby result in a possibility that the photosensitive recording medium is exposed to light.

The cartridge described in any one of JP-A-2003-317422, JP-A-7-210912 and JP-A-2001-216754 (corresponding to US 2001/0010680 A1) is formed by two shells substantially shaped like plates and superimposed on each other. The recording medium is received in the two shells. Since the two shells are generally fixed by screws, there is a problem that the number of components is increased and assembling efficiency deteriorates.

The cartridge described in any one of JP-A-2003-317422 (corresponding to US 2003/0198177 A1) and JP-A-7-210912 is provided with no light-shield plate but shielded from light by the shutter. Accordingly, there is room for improvement because light-shielding performance of the cartridge where the photosensitive recording medium is received is not sufficient. In addition, since the shutter is exposed to the outside directly, the shutter may be opened erroneously or the shutter may be deformed when a large external force acts on the shutter. This therefore brings a possibility that the holographic recording medium may become unusable due to exposure to light.

Improvement in light-shielding performance of the cartridge described in JP-A-2001-216754 (corresponding to US 2001/0010680 A1) is attained by further disposition of the light-shield plate in the outside of the shutter. In the cartridge described in JP-A-2001-216754 (corresponding to US 2001/0010680 A1) the light-shield plate is fixed to the cartridge body by adhesive tape because the recording medium is of a single-side recording type. The light-shield plate may be bonded again for the purpose of correction of its position etc. When the light-shield plate shaped like a thin plate is separated from the adhesive tape in the fixation using the adhesive tape, the light-shield plate may be deformed so that there is a problem that the light-shield plate separated from the adhesive tape cannot be used again to thereby cause deterioration of workability.

When the recording medium is of a double-side recording type, attachment of the light-shield plate substantially shaped like a U figure in section is performed by externally fitting the light-shield plate while pressing and widening the light-shield plate, in the same manner as the shutter. Accordingly, there is a possibility that the light-shield plate may be deformed to thereby cause deterioration of the light-shielding performance. In addition, although screwing of the light-shield plate down to the cartridge body may eliminate influence due to deformation of the light-shield plate and secure the light-shielding performance, this however results in increase in the number of components and deterioration of assembling efficiency so that there is still room for improvement.

The invention was developed under such circumstance. An object of the invention is to provide a photosensitive recording medium cartridge in which the number of screwed places can be reduced to thereby reduce the number of components and the number of assembling steps, and a method for producing the photosensitive recording medium cartridge.

The foregoing object of the invention is achieved by a photosensitive recording medium cartridge and a method for producing the same as follows.

(1) A photosensitive recording medium cartridge including: a photosensitive recording medium; a cartridge body including a disc storage portion where the photosensitive recording medium is received rotatably, an opening portion formed in a side surface of the cartridge body in an insertion direction, shutter slide surfaces offset inward and formed in an outer surface of the cartridge body so as to be connected to the opening portion-side side surface, and an inner opening exposing a center and a recording surface of the photosensitive recording medium to the outside; a shutter which is externally fitted from the opening portion-side side surface of the cartridge body and attached to the shutter slide surfaces and which is disposed so as to be movable between a close position for closing the inner opening and an open position for opening the inner opening; and a lid fixed to the side surface of the cartridge body so as to close the opening portion, wherein the shutter is attached to the shutter slide surfaces while the movement of the shutter is limited by the lid and first step portions formed in boundaries between the shutter slide surfaces and the outer surface.

According to the photosensitive recording medium cartridge configured thus, the opening portion is provided in the side surface of the cartridge body, and the shutter slide surfaces are offset inward and formed in the outer surface of the cartridge body. After the shutter is externally fitted to the shutter slide surfaces from the opening portion-side side surface, the lid is fixed to the opening portion. In this manner, the shutter is disposed between the lid and the first step portions of the shutter slide surfaces and attached to the shutter slide surfaces while movement of the shutter is limited. Thus, in order to externally fit the shutter to the shutter slide surfaces, it is not necessary to externally fit the shutter from the front in the insertion direction of the cartridge while making the shutter opened, as in the background art. Accordingly, the shutter is assembled to the cartridge body without being deformed so that light-shielding performance can be prevented from being lowered due to deformation of the shutter.

(2) A photosensitive recording medium cartridge according to the paragraph (1), wherein: the cartridge body has light-shield plate attachment surfaces offset inward and formed in the outside of the shutter slide surfaces; and the photosensitive recording medium cartridge further includes a light-shield plate which is externally fitted from the opening portion-side side surface of the cartridge body and fixed to the light-shield plate attachment surfaces so as to be held between the lid and second step portions formed in boundaries between the light-shield plate attachment surfaces and the outer surface.

According to the photosensitive recording medium cartridge configured thus, the light-shield plate is externally fitted from the opening portion-side side surface of the cartridge body and fixed to the light-shield plate attachment surfaces so as to be held between the lid fixed to the opening portion and the second step portions of the light-shield plate attachment surfaces. Accordingly, the light-shield plate can be externally fitted and fixed to the light-shield plate attachment surfaces of the cartridge body without being opened. In this manner, deformation of the light-shield plate at the time of attachment is prevented so that light-shielding performance is secured. Further, the light-shield plate is held and fixed between the lid and the second step portions without use of any screw etc. so that the number of components is reduced and improvement in assembling efficiency is attained.

(3) A photosensitive recording medium cartridge according to the paragraph (1) or (2), wherein the cartridge body has a first shell substantially shaped like a plate, and a second shell substantially shaped like a plate and superimposed and connected onto the first shell so as to form the disc storage portion.

According to the photosensitive recording medium cartridge configured thus, the cartridge body is formed by superimposing and connecting the first shell and the second shell onto each other. Thus, after the cartridge is formed by connecting the first shell and the second shell to each other, the shutter and the light-shield plate are externally fitted to the cartridge body from the opening portion-side side surface and the lid is fixed to the opening portion so that a photosensitive recording medium cartridge can be formed. In addition, when the lid is fixed to the cartridge body by bonding etc., the cartridge can be formed without use of any screw or with a reduced number of screwed places. In this manner, the number of components is reduced and assembling efficiency is improved.

(4) A photosensitive recording medium cartridge according to any one of the paragraphs (1) through (3), wherein: the lid is fitted to the opening portion and fixed to the cartridge body by ultrasonic welding, bonding, caulking, press-fitting, or engagement using lock members formed in the lid and the cartridge body.

According to the photosensitive recording medium cartridge configured thus, the opening portion of the cartridge body and the lid are fitted to each other, and fixed by ultrasonic welding, bonding, caulking, press-fitting, or engagement using the lock members formed in the lid and the cartridge body. Accordingly, screws etc. are dispensed with so that the number of components is reduced and assembling efficiency is improved.

(5) A photosensitive recording medium cartridge according to any one of the paragraphs (1) through (4), wherein the photosensitive recording medium is a holographic recording medium.

According to the photosensitive recording medium cartridge configured thus, a photosensitive recording medium cartridge where a holographic recording medium is received can be produced easily and inexpensively.

(6) A method for producing a photosensitive recording medium cartridge, including the steps of: receiving the photosensitive recording medium in the disc storage portion rotatably; attaching the shutter movably to the shutter slide surfaces from the opening portion-side side surface of the cartridge body; and fixing the lid to the opening portion of the cartridge body to close the opening portion.

According to the method for producing a photosensitive recording medium cartridge, after the photosensitive recording medium is received in the disc storage portion rotatably, the shutter is attached movably to the shutter slide surfaces from the opening portion-side side surface, and the lid is fixed to the opening portion of the cartridge body. Accordingly, the shutter can be assembled easily without being deformed and the number of components can be reduced. In this manner, excellent light-shielding performance is also secured.

(7) A method for producing a photosensitive recording medium cartridge according to the paragraph (6), further including the step of attaching the light-shield plate to the light-shield plate attachment surfaces from the opening portion-side side surface of the cartridge body after attachment of the shutter to the shutter slide surfaces to thereby cover the outside of the shutter with the light-shield plate.

According to the method for producing a photosensitive recording medium cartridge, after the shutter is attached to the shutter slide surfaces in the aforementioned manner, the light-shield plate is attached to the light-shield plate attachment surfaces from the opening portion-side side surface so that the outside of the shutter is covered with the light-shield plate. Accordingly, the light-shield plate can be attached without being deformed, so that light-shielding performance can be improved.

According to the photosensitive recording medium cartridge and the method for producing the same in the invention, the shutter and the light-shield plate are externally fitted from the opening portion-side side surface formed in the cartridge body, and assembled to the cartridge body. Then, the lid is fixed to the opening portion so as to close the opening portion, the shutter is held between the lid and the shutter slide surfaces, and the light-shield plate is held between the lid and the light-shield plate attachment surfaces. Accordingly, it is possible to provide a photosensitive recording medium cartridge reduced in the number of screwed places to be thereby reduced in the number of components and the number of assembling steps, and a method for producing the photosensitive recording medium cartridge.

BRIEF DESCRIPTION OF THE DRAWINGS

FIGS. 3A to 3C are sectional views taken on the line III-IIII in FIG. 1, wherein FIG. 3A is an overall view, FIG. 3B is an enlarged view of a front end edge portion, and FIG. 3C is an enlarged view of a rear end edge portion.

DETAILED DESCRIPTION OF THE INVENTION

Figure 1:
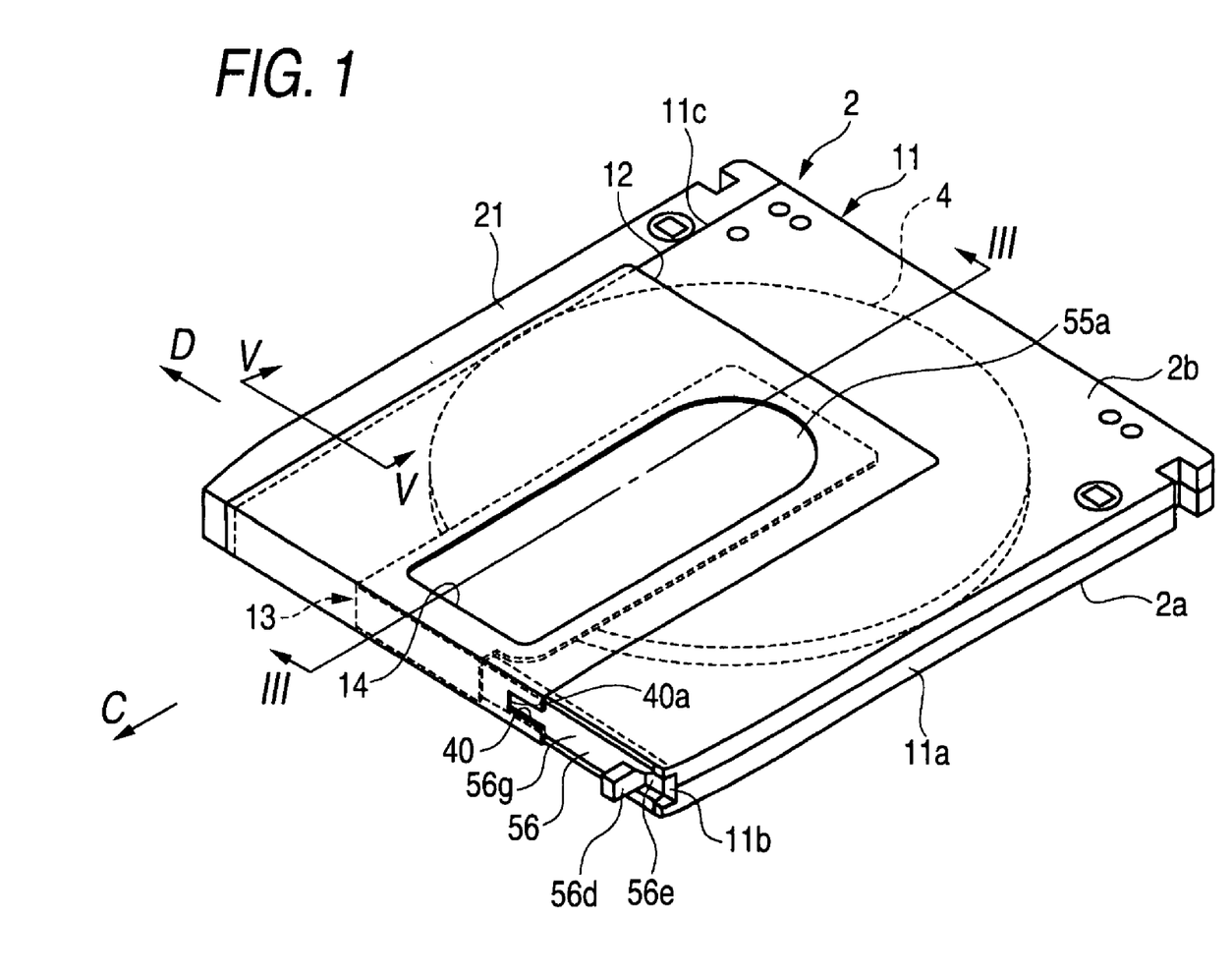
FIG. 1 is a perspective view showing the shape of an external appearance of a cartridge for carrying out the invention.
Figure 2:
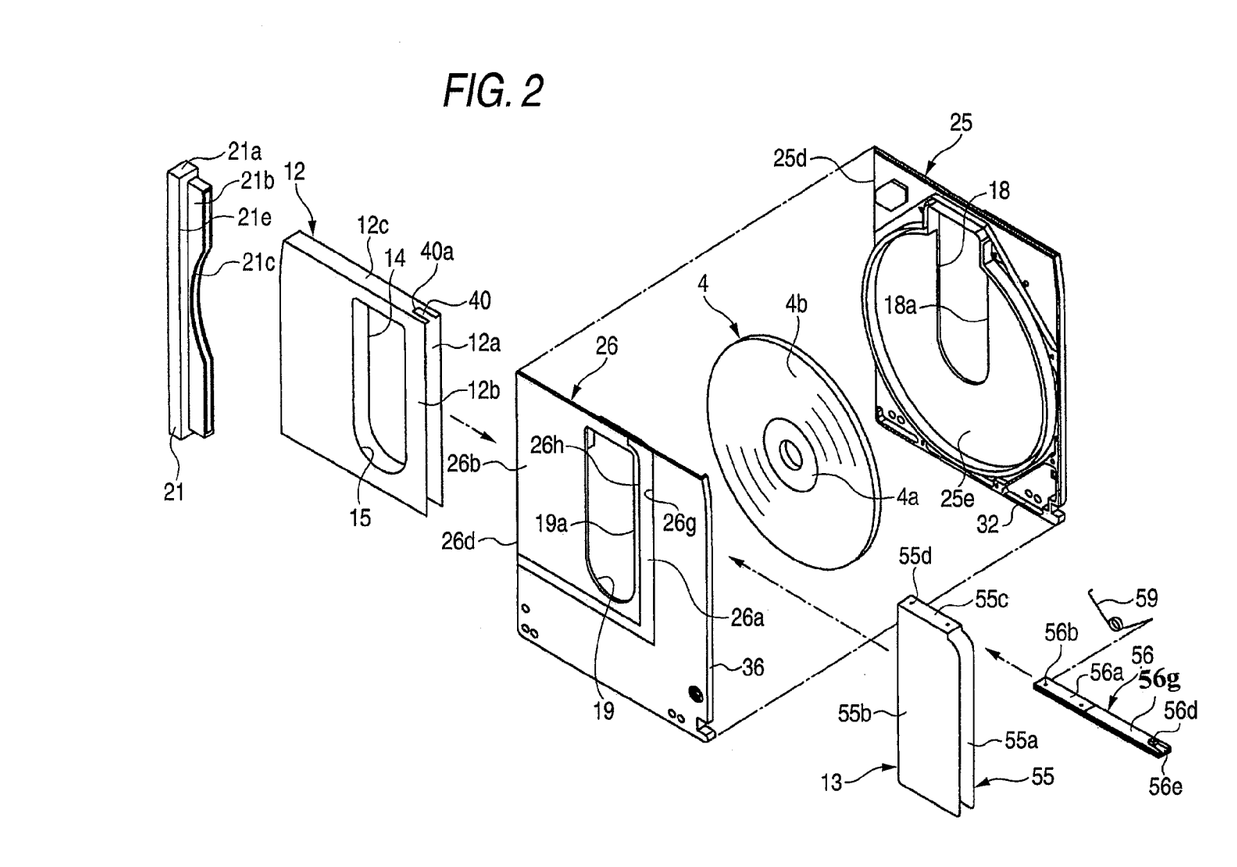
FIG. 2 is an exploded perspective view showing the configuration of the cartridge.
Figure 3A:
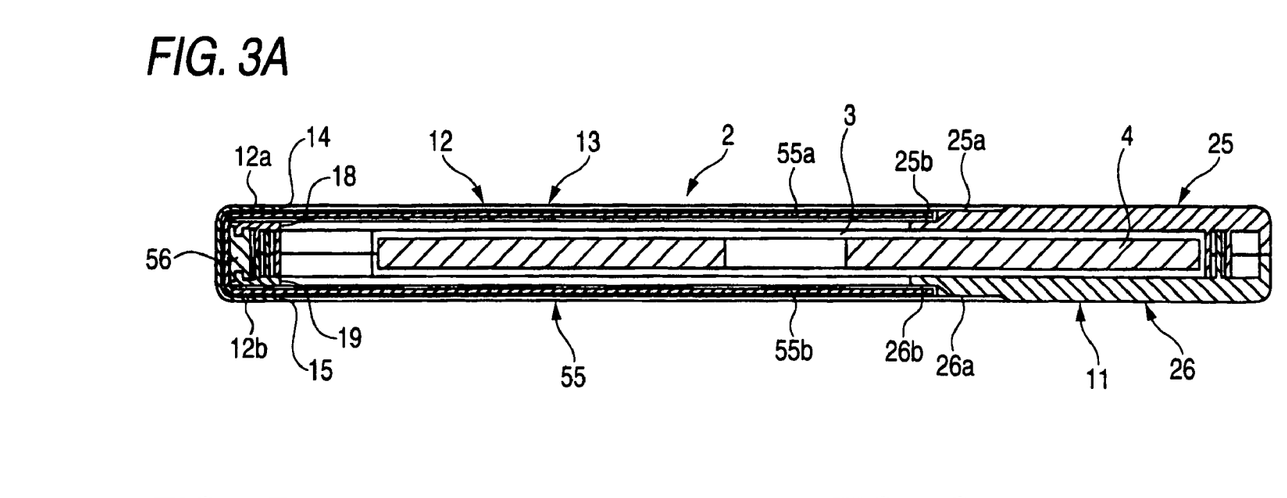
Figure 3B:
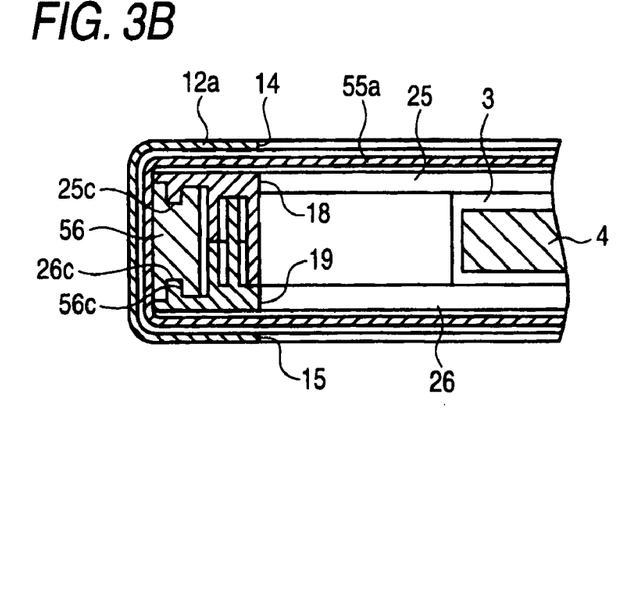
Figure 3C:
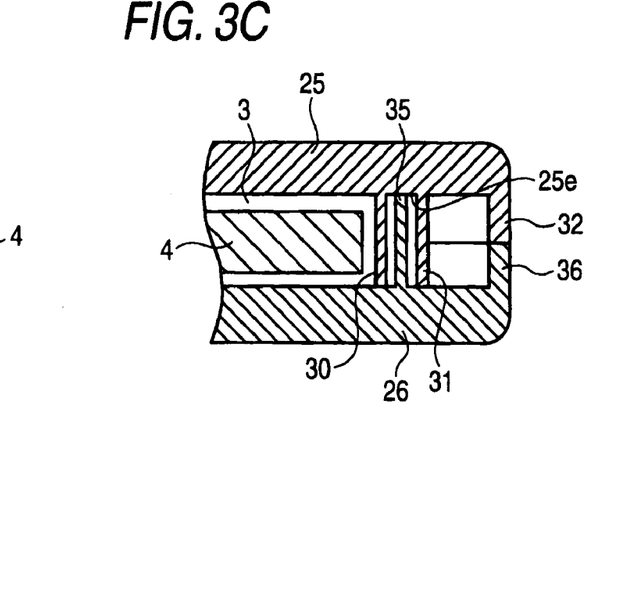
Figure 4:
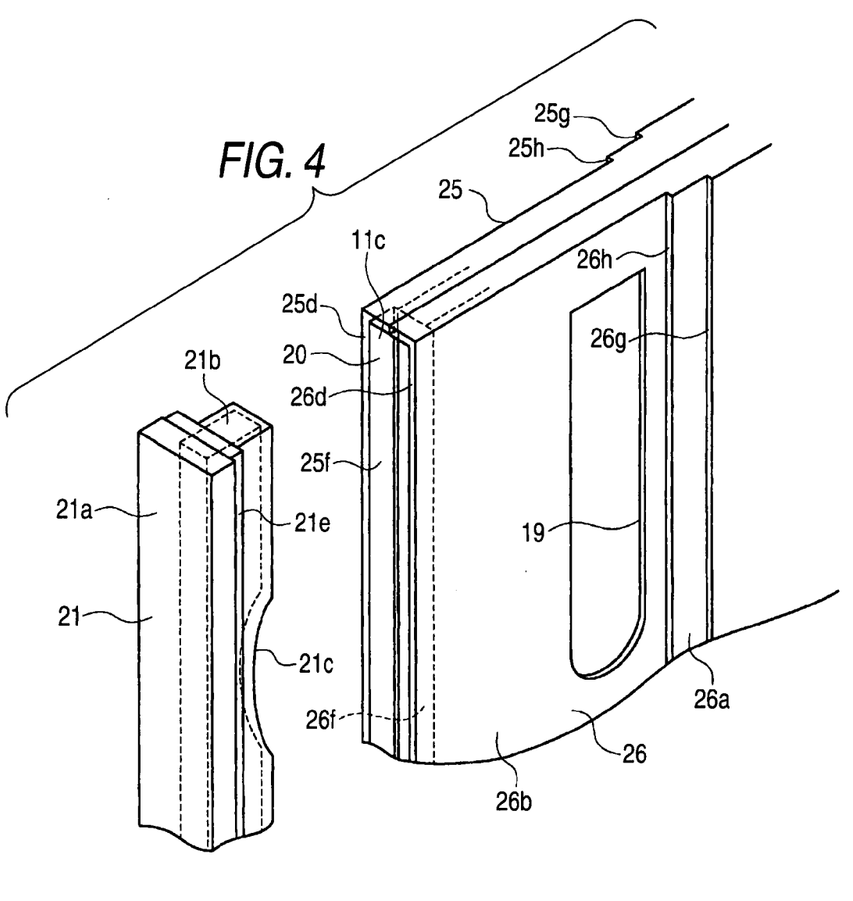
FIG. 4 is an enlarged exploded perspective view of important part of the cartridge shown after a shutter and a light-shield plate are removed.
Figure 5:
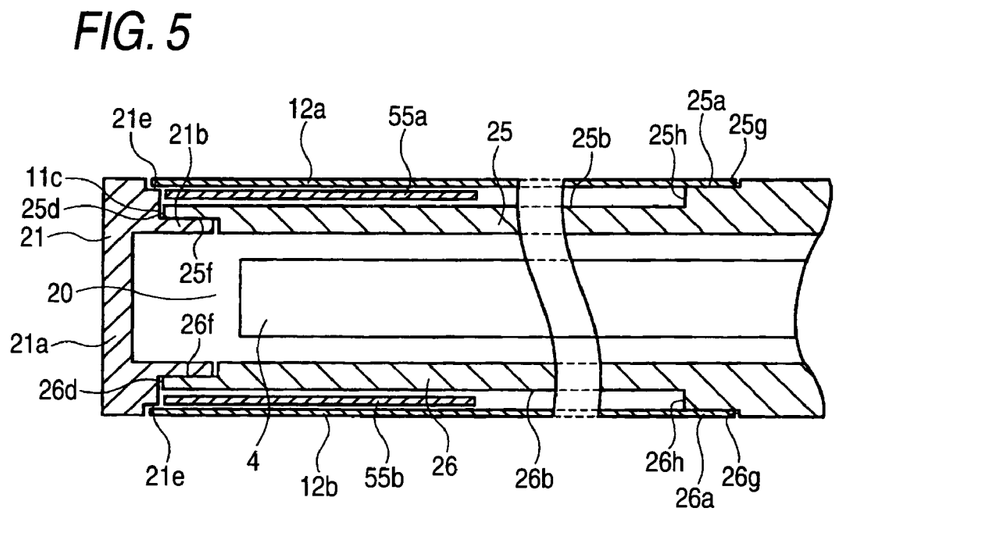
FIG. 5 is a sectional view taken on the line V-V in FIG. 1.

An embodiment of the invention will be described below in detail with reference to the drawings. FIG. 1 is a perspective view of a holographic recording medium cartridge (hereinafter referred to as cartridge simply) according to the embodiment of the invention. FIG. 2 is an exploded perspective view showing the configuration of the cart 3A to 3C are sectional views taken on the line III-IIII in FIG. 1. FIG. 3A is an overall view. FIG. 3B is an enlarged view of a front end edge portion. FIG. 3C is an enlarged view of a rear end edge portion. FIG. 4 is an enlarged exploded perspective view of important part of the cartridge shown after a shutter and a light-shield plate are removed. FIG. 5 is a sectional view taken on the line V-V in FIG. 1.

As shown in FIGS. 1 and 2, the cartridge 2 is mounted, in a direction of an arrow C, into a holographic recording apparatus etc. for handling the cartridge. A photosensitive recording medium (hereinafter referred to as "recording disc") 4 received rotatably in a disc storage portion 3 (see FIGS. 3A to 3C) of the cartridge 2 is a holographic recording disc having a hole formed in its central portion. Holographic recording layers are provided in opposite surfaces of the recording disc 4.

For example, on each of the holographic recording layers, data are multiplexedly recorded as interference fringes of laser light by the laser light in a range of from a green wavelength of 532 nm to a blue wavelength of 405 nm. Incidentally, a reinforcement material may be added to the hole portion of the recording disc 4. In order to record data on the opposite recording surfaces of the recording disc 4, the cartridge 2 is set in the holographic recording apparatus while an A surface 2a or a B surface 2b of the cartridge 2 is made to face upward.

The cartridge 2 includes a cartridge body 11, a lid 21, a light-shield plate 12, and a shutter 13. The disc storage portion 3 is provided in the cartridge body 11. An opening portion 20 formed in a side surface 11c of the cartridge body 11 is closed with the lid 21. The light-shield plate 12 is attached to the outside of the cartridge body 11 so as to sandwich the cartridge body 11. The shutter 13 is put between the cartridge body 11 and the light-shield plate 12. Outer holes 14 and 15 each substantially shaped like a rectangle as a second opening are formed in upper and lower surfaces of the light-shield plate 12, respectively. These outer holes 14 and 15 are closed with a first shutter 55a and a second shutter 55b when the shutter 13 is in a close position.

When the shutter 13 is moved to an open position in a direction of an arrow D, inner holes 18 and 19 having the same shapes and provided in the cartridge body 11 are opened together with the outer holes 14 and 15, so as to face the outer holes 14 and 15 respectively. Thus, a central portion 4a and recording surfaces 4b of the recording disc 4 which is received in the disc storage portion 3 are exposed to the outside. The shutter 13 is urged to the close position by an internal shutter spring.

As shown in FIG. 2, the cartridge body 11 includes a first shell 25 substantially shaped like a plate, and a second shell 26 connected to the first shell 25. For example, the first shell 25 and the second shell 26 are formed by injection molding out of one and the same thermoplastic or similar thermoplastics each containing additives of a light-shield substance and a lubricant.

As shown in FIG. 3C which is an enlarged sectional view of the rear end edge portion of the cartridge 2, a first light-shield wall 30, a second light-shield wall 31 and protrusive lines 32 are provided in the inner surface of the first shell 25. The first light-shield wall 30 is a protrusive line formed into a size with a diameter larger than the outer diameter of the recording disc 4. The second light-shield wall 31 is provided in the outside of the first light-shield wall 30. The protrusive lines 32 are formed in three side edge portions, exclusive of a side surface 25d. The inner hole 18 exposing the central portion 4a and the recording surface 4b of the recording disc 4 to the outside is provided in the inside of the first light-shield wall 30.

A third light-shield wall 35 and protrusive lines 36 are provided in the inner surface of the second shell 26. The third light-shield wall 35 is a protrusive line formed into a size with a diameter larger than the outer diameter of the recording disc 4. The third light-shield wall 35 is inserted between the first light-shield wall 30 and the second light-shield wall 31 of the first shell 25. The protrusive lines 36 are formed in three side edge portions, exclusive of a side surface 26d. The inner hole 19 exposing the central portion 4a and the recording surface 4b of the recording disc 4 to the outside is provided in the inside of the third light-shield wall 35.

When the recording disc 4 is placed in the inside of the third light-shield wall 35 of the second shell 26 and the first shell 25 is superimposed on the upper surface of the second shell 26, the third light-shield wall 35 is inserted between the first light-shield wall 30 and the second light-shield wall 31 so that the front end of the third light-shield wall 35 abuts on an inner surface 25e of the first shell 25. The disc storage portion 3 is formed by these light-shield walls 30, 31 and 35 and the inner surfaces of the first and second shells 25 and 26.

The side wall of the disc storage portion 3 is formed in a labyrinth-shaped light-shielding structure complicatedly made of the three light-shield walls 30, 31 and 35. With this structure, even when light or dust enters through a mating portion between the first and second shells 25 and 26, the light or dust never goes into the disc storage portion 3. The front end of the third light-shield wall 35 of the second shell 26 is fixed to the inner surface 25e of the first shell 25 by ultrasonic welding. Accordingly, the first shell 25 and the second shell 26 are connected firmly to each other so that no gap is formed in the mating portion between the first shell 25 and the second shell 26.

When the first shell 25 and the second shell 26 are superimposed and connected to each other, the opening portion 20 is formed in the side surface 11c and opened to the outside. The side surface 11c is formed by the side surfaces 25d and 26d in which the protrusive lines 32 and 36 are not provided.

As shown in FIGS. 2 and 3A to 3C, light-shield plate attachment surfaces 25a and 26a each offset inward to have a size slightly larger than the shape of the light-shield plate 12 and with a depth not smaller than the thickness of the light-shield plate 12 are formed in the outer surfaces of the first shell 25 and the second shell 26.

As shown in FIGS. 1, 2, 4, and 5, the lid 21 is fitted to the opening portion 20 so as to close the opening portion 20. The lid 21 is a bottomed box substantially shaped like a rectangular parallelepiped having a length equal to the length of the side surface 11c of the cartridge body 11. In the lid 21, a rib 21b shaped like a rectangular frame is provided erectly on a body portion 21a. A light-shield plate support surface 21e is formed in three sides of an outer circumference of the body portion 21a on the rib side, correspondingly to the light-shield plate attachment surfaces 25a and 26a.

The rectangular frame-like rib 21b is internally fitted to the cartridge body 11 so that the lid 21 is fixed to the cartridge body 11. An escape portion 21c shaped like a circular arc by cutting is formed in a portion of the rib 21b corresponding to the second light-shield wall 31. When the lid 21 is fixed to the side surface 11c of the cartridge body 11, the escape portion 21c does not become an obstacle. Incidentally, connection surfaces 25f and 26f carved in the outer sides are formed in the inner surfaces of the first and second shells 25 and 26 on the sides of the side surfaces 25d and 26d so as to be fitted to the rib 21b of the lid 21.

A material, such as an aluminum alloy, which can obtain light-shielding performance, corrosion resistance, decoration effect and processing characteristic and which is light in weight and strong is used as the material of the light-shield plate 12. Alternatively, the light-shield plate 12 may be formed out of a plastic. In this case, a plastic containing additives of a light-shield substance and a lubricant is preferably used in order to secure light-shielding performance and slidability of the shutter 13.

As shown in FIG. 2, the light-shield plate 12 is formed by making outer holes 14 and 15 and a notch 40 for gaining a movement range of the shutter 13 in a thin aluminum alloy plate and bending the thin aluminum alloy plate substantially into a U shape in section. In this manner, the light-shield plate 12 is provided with a first plate portion 12a having the outer hole 14, a second plate portion 12b having the outer hole 15, and a third plate portion 12c including the notch 40 and connected to the first and second plate portions 12a and 12b.

The light-shield plate 12 is attached to the light-shield plate attachment surfaces 25a and 26a of the cartridge body 11 so that the B surface 2b and the A surface 2a of the cartridge body 11 are held by the first and second plate portions 12a and 12b and the front end of the cartridge body 11 in the mounting direction C is covered with the third plate portion 12c. The light-shield plate attachment surfaces 25a and 26a are offset inward to have a depth not smaller than the thickness of the light-shield plate 12 so that the outer surface of the light-shield plate 12 attached to the cartridge body 11 does not protrude from the surface of the cartridge 2.

The shutter 13 includes a shutter member 55 and a slide member 56. The shutter member 55 is formed by bending a thin light-shield plate substantially into a U shape. The slide member 56 is shaped like a long and narrow plate and attached to the shutter member 55. For the same reason as the light-shield plate 12, the shutter member 55 is, for example, formed out of an aluminum alloy. Alternatively, the shutter member 55 may be formed out of a plastic. In this case, a plastic containing additives of a light-shield substance and a lubricant is preferably used in order to secure light-shielding performance and slidability. The slide member 56 is formed out of a plastic containing additives of a light-shield substance and a lubricant.

The shutter member 55 includes a first shutter 55a, a second shutter 55b and a joint 55c. The first shutter 55a is inserted between the outer surface of the first shell 25 and the first plate portion 12a of the light-shield plate 12. The second shutter 55b is inserted between the outer surface of the second shell 26 and the second plate portion 12b of the light-shield plate 12. The joint 55c is connected to the first and second shutters 55a and 56a while the slide member 56 is attached to the joint 55c.

Shutter slide surfaces 25b and 26b offset inward to have a depth not smaller than the thickness of the shutter member 55 are formed in the inside of the light-shield plate attachment surfaces 25a and 26a in the outer surfaces of the first and second shells 25 and 26. In this manner, the shutter 13 can move between the cartridge body 11 and the light-shield plate 12 so smoothly that generation of chips etc. due to the movement of the shutter 13 can be suppressed. Incidentally, the shutter slide surfaces 25b and 26b may be roughened in order to diffuse incident light. Similarly, the inner surface of the light-shield plate 12 and the inner and outer surfaces of the shutter 13 may be roughened.

The slide member 56 is put slidably between the first shell 25 and the second shell 26 so that a front surface 56g of the slide member 56 in the mounting direction of the cartridge 2 is exposed from the front end surface of the cartridge body 11 in the mounting direction. An attachment surface 56a to be attached to the inner surface of the joint 55c of the shutter member 55 is provided in one end portion of the front surface 56g of the slide member 56. For example, two pins 56b are formed integrally with the attachment surface 56a. When the two pins 56b are inserted into two holes 55d provided in the joint 55c and front ends of the pins 56b are melted down by heat, the shutter member 55 and the slide member 56 are fixed to each other. Incidentally, an adhesive agent, double-sided adhesive tape, etc. may be used for the fixation. Various kinds of welding may be used when the shutter member 55 is formed out of a plastic. In addition, screwing may be used.

As shown in FIGS. 2 and 3B, grooves 56c are formed along a longitudinal direction in side surfaces of the slide member 56. Protrusive lines 25c and 26c provided in the inner surfaces of the first and second shells 25 and 26 on the front end side in the mounting direction are inserted into the grooves 56c. By means of the grooves 56c and the protrusive lines 25c and 26c, the slide member 56 can be moved slidably without being displaced from the cartridge body 11.

An engagement groove 56e is provided in a shutter-closing side end portion of the front surface 56g of the slide member 56. A lock portion 56d to be operated for opening the shutter 13 is formed in the inner side of the engagement groove 56e so as to protrude frontward, in the insertion direction of the cartridge 2, from the front surface 56g of the slide member 56. A recess 11b cut substantially into a U shape having a depth equal to the depth of the engagement groove 56e is formed in a corner portion of the front end of a shutter-closing-side side end wall 11a of the cartridge body 11 (see FIG. 1). When the slide member 56 is assembled to the cartridge body 11, the bottom of the recess 11b becomes on a level with the bottom of the engagement groove 56e.

When the lock portion 56d is provided so as to extend the slide member 56 with respect to the shutter member 55 in a closing direction of the shutter, the slide member 56 is exposed to the outside without being hidden by the third plate portion 12c of the light-shield plate 12. The notch 40 in the third plate portion 12c of the light-shield plate 12 is provided for avoiding interference with the lock portion 56d when the shutter 13 is moved to the open position. In the case where a movement distance of the shutter 13 is too short to open the inner holes 18 and 19, formation of the notch 40 permits prolongation of the movement distance.

In view from the light-shielding performance, it is preferable that the notch 40 is not provided. Even when the notch 40 is provided, formation of an end edge 40a of the notch 40 separately from edge portions 18a and 19a of the inner openings 18 and 19 as much as possible in the closing direction of the shutter has to be taken into consideration, in order not to lower the light-shielding performance.

The shutter 13 is urged by a shutter spring 59. For example, the shutter spring 59 is made of a torsion coil spring. Opposite ends of the shutter spring 59 are stopped by the slide member 56 and the inner surface of the first shell 25.

Next, a method for producing the cartridge 2 will be described with reference to FIGS. 4 and 5. As shown in FIGS. 4 and 5, the recording disc 4 is placed in the inside of the third light-shield wall 35 of the second shell 26, the first shell 25 is superimposed on the upper surface of the second shell 26, and the front end of the third light-shield wall 35 inserted between the first light-shield wall 30 and the second light-shield wall 31 of the first shell 25 is fixed to the inner surface 25e of the first shell 25 by ultrasonic welding etc. (See FIG. 3C). On this occasion, the opening portion 20 is formed in the side surface 11c.

Then, the shutter member 55 is attached to the shutter slide surfaces 25b and 26b from the side surface 11c side of the cartridge body 11 so that the A surface 2a and the B surface 2b of the cartridge body 11 is held by the first shutter 55a and the second shutter 55b of the shutter member 55 and the front end of the cartridge body 11 in the mounting direction C is covered with the joint 55c. On this occasion, the shutter member 55 substantially shaped like a U figure can be attached to the shutter slide surfaces 25b and 26b without being opened so that the shutter member 55 is not deformed.

Incidentally, even when the light-shield plate attachment surfaces 25a and 26a are formed in front of the shutter slide surfaces 25b and 26b, each of steps of the light-shield plate attachment surfaces 25a and 26a is about 0.5 mm which is equal to the thickness of the light-shield plate 12 so that the shutter member 55 can be assembled smoothly without being deformed.

Then, the light-shield plate 12 is externally fitted from the side surface 11c side of the cartridge body 11 and attached to the light-shield plate attachment surfaces 25a and 26a so that the shutter member 55 is covered with the light-shield plate 12. On this occasion, similarly to the shutter member 55, the light-shield plate 12 can be attached to the light-shield plate attachment surfaces 25a and 26a without being opened so that the light-shield plate 12 is not deformed.

While the light-shield plate 12 is externally fitted to the light-shield plate support surface 21e of the lid 21, the rib 21b of the lid 21 is inserted into the opening portion 20. The rib 21b is fixed to the connection surfaces 25f and 26f of the first and second shells 25 and 26 by ultrasonic welding, bonding, etc. so that the opening portion 20 is closed to be shielded from light. Accordingly, the light-shield plate 12 is fixed to the light-shield plate attachment surfaces 25a and 26a while held between the lid 21 and second step portions 25g and 26g of the light-shield plate attachment surfaces 25a and 26a. At the same time, the shutter member 55 is movably attached to the shutter slide surfaces 25b and 26b in the condition that the shutter member 55 is disposed between the lid 21 and first step portions 25h and 26h of the shutter slide surfaces 25b and 26b while movement of the shutter member 55 is limited therebetween.

That is, the method for producing the photosensitive recording medium cartridge 2 according to the invention is a production method including the steps of: receiving the photosensitive recording medium 4 in the disc storage portion 3 rotatably; attaching the shutter 13 movably to the shutter slide surfaces 25b and 26b from the side surface 11c of the cartridge body 11 on the opening portion 20 side and then attaching the light-shield plate 12 to the light-shield plate attachment surfaces 25a and 26a from the side surface 11c of the cartridge body 11 on the opening portion 20 side so that the outside of the shutter 13 is covered with the light-shield plate 12; and fixing the lid 21 to the opening portion 20 of the cartridge body 11 so as to close the opening portion 20.

Figure 6:
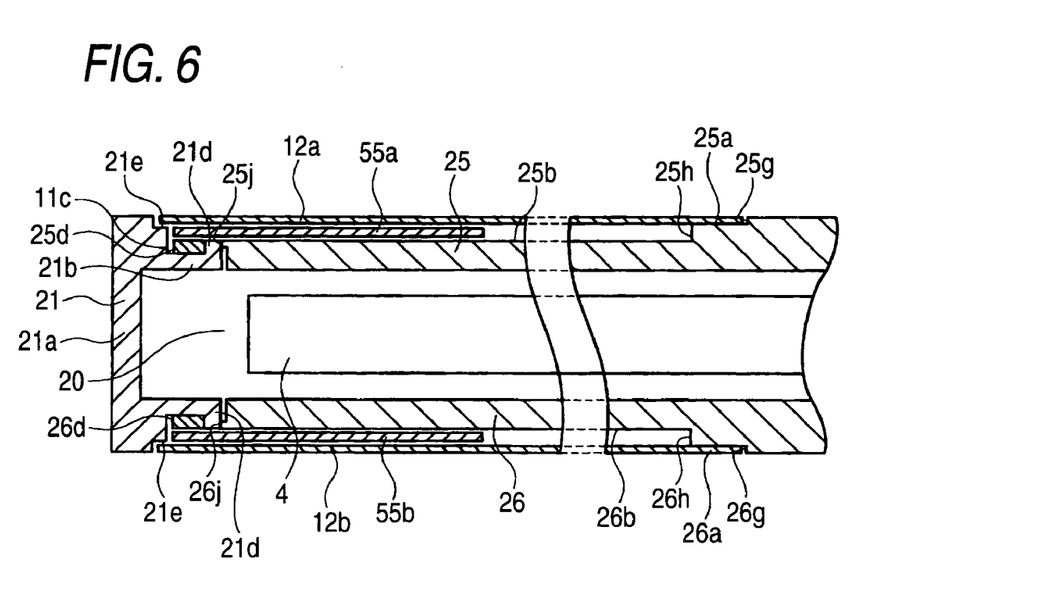
FIG. 6 is a sectional view of a portion of a modification, corresponding to FIG. 5.

Next, a modification of the cartridge will be described with reference to FIG. 6. FIG. 6 is a sectional view of a portion of the modification corresponding to FIG. 5. Incidentally, the modification of the cartridge is the same as the cartridge according to the embodiment as shown in FIGS. 1 to 5, except that a method for fixing a lid and a cartridge body is different. Thus, identical or similar reference numerals refer to corresponding parts for the sake of omission or simplification of description thereof.

As shown in FIG. 6, lock holes 25*j* and 26*j* as one-side lock members are formed in end portions of first and second shells 25 and 26 on the side of an opening portion 20 in the modification of the cartridge 2. Lock protrusions 21*d* as the other-side lock members are provided in a rib 21*b* of a lid 21 correspondingly to the lock holes 25*j* and 26*j*. The rib 21*b* of the lid 21 is fitted to the opening portion 20 of a cartridge body 11 to which a shutter 13 and a light-shield plate 12 have been attached, and the lock protrusions 21*d* are engaged with the lock holes 25*j* and 26*j* so that the lid 21 is fixed to the cartridge body 11.

Figure 7:
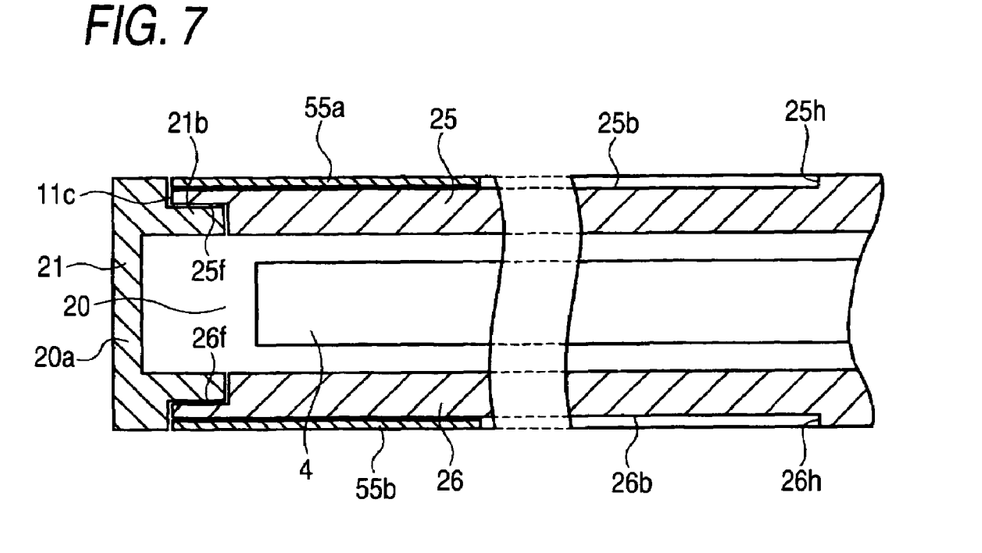
FIG. 7 is a sectional view of a portion corresponding to FIG. 5, in a cartridge provided with no light-shield plate.

Next, a cartridge provided with no light-shield plate will be described with reference to FIG. 7. FIG. 7 is a sectional view of a portion corresponding to FIG. 5, in the cartridge provided with no light-shield plate. Incidentally, this cartridge is the same as the cartridge according to the embodiment as shown in FIG. 5, except that this cartridge is provided with no light-shield plate. Thus, identical or similar reference numerals refer to corresponding parts for the sake of omission or simplification of description thereof.

As shown in FIG. 7, shutter slide surfaces 25*b* and 26*b* are offset inward and formed in outer surfaces of a first shell 25 and a second shell 26 in the cartridge 2 provided with no light-shield plate. A shutter member 55 is externally fitted from a side surface 11*c* on the side of an opening portion 20 and assembled to the shutter slide surfaces 25*b* and 26*b*. On this occasion, the shutter member 55 substantially shaped like a U figure can be attached to the shutter slide surfaces 25*b* and 26*b* without being opened so that the shutter member 55 is not deformed.

A rib 21*b* of a lid 21 is fitted to the opening portion 20. The rib 21*b* is fixed to connection surfaces 25*f* and 26*f* of the first and second shells 25 and 26 by ultrasonic welding or bonding so that the opening portion 20 is closed to be shielded from light. Thus, the shutter member 55 is movably attached to the shutter slide surfaces 25*b* and 26*b* in the condition that the shutter member 55 is disposed between the lid 21 and first step portions 25*h* and 26*h* of the shutter slide surfaces 25*b* and 26*b* while movement of the shutter member 55 is limited therebetween.

Figure 8:
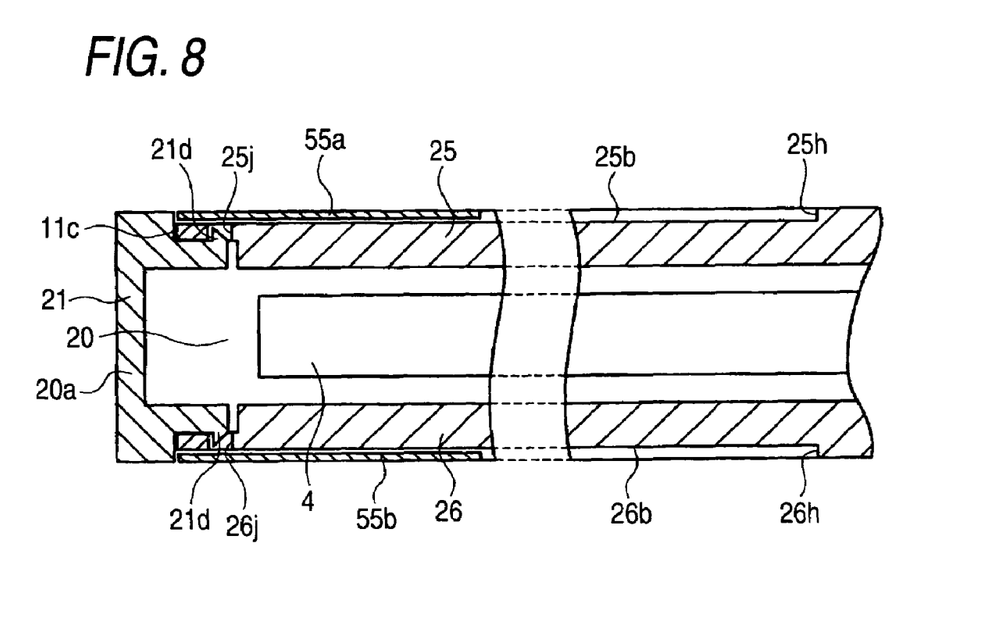
FIG. 8 is a sectional view of a portion corresponding to FIG. 5, in a modification of the cartridge provided with no light-shield plate.

Next, a modification of the cartridge provided with no light-shield plate will be described with reference to FIG. 8. FIG. 8 is a sectional view of a portion corresponding to FIG. 5, in the modification of the cartridge provided with no light-shield plate. Incidentally, this modification of the cartridge is the same as the modification of the cartridge as shown in FIG. 6, except that this modification of the cartridge is provided with no light-shield plate. Thus, identical or similar reference numerals refer to corresponding parts for the sake of omission or simplification of description thereof.

As shown in FIG. 8, lock holes 25*j* and 26*j* are formed in end portions of first and second shells 25 and 26 on the side of an opening portion 20 in the modification of the cartridge 2 provided with no light-shield plate. In addition, lock protrusions 21*d* are provided in a rib 21*b* of a lid 21 correspondingly to the lock holes 25*j* and 26*j*. A shutter member 55 is externally fitted from a side surface 11*c* on the side of the opening portion 20 and assembled to shutter slide surfaces 25*b* and 26*b*. On this occasion, the shutter member 55 substantially shaped like a U figure can be attached to the shutter slide surfaces 25*b* and 26*b* without being opened, so that the shutter member 55 is not deformed.

The rib 21*b* of the lid 21 is fitted to the opening portion 20 of a cartridge body 11 to which the shutter member 55 has been attached, and lock protrusions 21*d* engage with the lock holes 25*j* and 26*j*, so that the lid 21 is fixed to the cartridge body 11. Thus, the shutter member 55 is movably attached to the shutter slide surfaces 25*b* and 26*b* in the condition that movement of the shutter member 55 is limited by the lid 21 and first step portions 25*h* and 26*h* of the shutter slide surfaces 25*b* and 26*b*.

Although description has been made on the case where the cartridge body and the lid are fixed to each other by ultrasonic welding, bonding or engagement using lock members, the invention is not limited thereto. Other fixation methods such as press-fitting, caulking, etc. may be used for the fixation. In addition, although ultrasonic welding is used for fixation between the first shell and the second shell, other welding methods and fixation methods may be used. When, for example, the first and second shells are fixed to each other by screws etc., it is preferable that a light-shielding structure is formed in the circumference of each screw hole. In addition, although each of the second shell and the first shell is formed by one component, each of the second shell and the first shell may be formed by assembling a plurality of components. When, for example, each of the second shell and the first shell is formed by two components with the shutter storage portion as a boundary, mold can be simplified.

Although description has been made on the case where a cartridge for storing a double-side recordable recording disc is taken as an example, the cartridge may be formed for storing a single-side recordable recording disc. In this case, an opening is formed only in one surface and this opening is opened/closed by the shutter. Although description has been made on an example of a cartridge for receiving a holographic recording medium, the invention can be applied also to a cartridge for storing a recording medium having another photosensitive characteristic. Although description has been made on the case where the cartridge is provided with no lock mechanism for the shutter, the invention is also applicable to a cartridge provided with a lock mechanism. In this case, exposure of a photosensitive recording medium to light due to unintentional opening of a shutter can be prevented preferably.

This application is based on Japanese Patent application JP 2005-241487, filed Aug. 23, 2005, the entire content of which is hereby incorporated by reference, the same as if set forth at length.

What is claimed is:

1. A photosensitive recording medium cartridge comprising:
    a photosensitive recording medium;
    a cartridge body including a disc storage portion where the photosensitive recording medium is received rotatably, an opening portion formed in a side surface of the cartridge body in an insertion direction, shutter slide surfaces offset inward from side surfaces of the cartridge body and formed in an outer surface of the cartridge body so as to be connected to the opening portion-side side surface, and an inner opening for exposing a center and a recording surface of the photosensitive recording medium to the outside;
    a shutter which is externally fitted from the opening portion-side side surface of the cartridge body and attached to the shutter slide surfaces and which is disposed so as to be movable between a close position for closing the inner opening and an open position for opening the inner opening; and a lid fixed to the side surface of the cartridge body so as to close the opening portion, wherein the shutter is attached to the shutter slide surfaces while the movement of the shutter is limited by the lid and first step portions formed in boundaries between the shutter slide surfaces and the outer surface.

2. The photosensitive recording medium cartridge according to claim 1, wherein:

the cartridge body has light-shield plate attachment surfaces offset inward from side surfaces of the cartridge body and formed in the outside of the shutter slide surfaces; and the photosensitive recording medium cartridge further comprises a light-shield plate which is externally fitted from the opening portion-side side surface of the cartridge body and fixed to the light-shield plate attachment surfaces so as to be held between the lid and second step portions formed in boundaries between the light-shield plate attachment surfaces and the outer surface.

3. The photosensitive recording medium cartridge according to claim 2, wherein the cartridge body has a first shell substantially shaped like a plate, and a second shell substantially shaped like a plate and superimposed and connected onto the first shell so as to form the disc storage portion.

4. The photosensitive recording medium cartridge according to claim 3, wherein the lid is fitted to the opening portion and fixed to the cartridge body by ultrasonic welding, bonding, caulking, press-fitting, or engagement using lock members formed in the lid and the cartridge body.

5. The photosensitive recording medium cartridge according claim 4, wherein the photosensitive recording medium is a holographic recording medium.

6. The photosensitive recording medium cartridge according to claim 3, wherein the photosensitive recording medium is a holographic recording medium.

7. The photosensitive recording medium cartridge according to claim 2, wherein the lid is fitted to the opening portion and fixed to the cartridge body by ultrasonic welding, bonding, caulking, press-fitting, or engagement using lock members formed in the lid and the cartridge body.

8. The photosensitive recording medium cartridge according claim 7, wherein the photosensitive recording medium is a holographic recording medium.

9. The photosensitive recording medium cartridge according claim 2, wherein the photosensitive recording medium is a holographic recording medium.

10. The photosensitive recording medium cartridge according to claim 1, wherein the cartridge body has a first shell substantially shaped like a plate, and a second shell substantially shaped like a plate and superimposed and connected onto the first shell so as to form the disc storage portion.

11. The photosensitive recording medium cartridge according to claim 10, wherein the lid is fitted to the opening portion and fixed to the cartridge body by ultrasonic welding, bonding, caulking, press-fitting, or engagement using lock members formed in the lid and the cartridge body.

12. The photosensitive recording medium cartridge according claim 11, wherein the photosensitive recording medium is a holographic recording medium.

13. The photosensitive recording medium cartridge according claim 10, wherein the photosensitive recording medium is a holographic recording medium.

14. The photosensitive recording medium cartridge according to claim 1, wherein the lid is fitted to the opening portion and fixed to the cartridge body by ultrasonic welding, bonding, caulking, press-fitting, or engagement using lock members formed in the lid and the cartridge body.

15. The photosensitive recording medium cartridge according claim 14, wherein the photosensitive recording medium is a holographic recording medium.

16. The photosensitive recording medium cartridge according claim 1, wherein the photosensitive recording medium is a holographic recording medium.

17. A method for producing the photosensitive recording medium cartridge of claim 1, comprising:

receiving the photosensitive recording medium in the disc storage portion rotatably;

attaching the shutter movably to the shutter slide surfaces from the opening portion-side side surface of the cartridge body; and fixing the lid to the opening portion of the cartridge body to close the opening portion.

18. The method according to claim 17, further comprising: attaching the light-shield plate to the light-shield plate attachment surfaces from the opening portion-side side surface of the cartridge body after attachment of the shutter to the shutter slide surfaces to thereby cover the outside of the shutter with the light-shield plate.

* * * * *